US 9,203,941 B2

(12) United States Patent  (10) Patent No.: US 9,203,941 B2
Cheon  (45) Date of Patent: Dec. 1, 2015

(54) DISPLAY DEVICE AND MOBILE TERMINAL HAVING THE SAME

(71) Applicant: Samsung Display Co., Ltd., Yongin, Gyeonggi-do (KR)

(72) Inventor: Kyu-Hyeong Cheon, Yongin-si (KR)

(73) Assignee: Samsung Display Co., Ltd., Gyeonggi-do (KR)

( * ) Notice: Subject to any disclaimer, the term of this patent is extended or adjusted under 35 U.S.C. 154(b) by 22 days.

(21) Appl. No.: 14/026,082

(22) Filed: Sep. 13, 2013

(65) Prior Publication Data

US 2014/0333830 A1  Nov. 13, 2014

(30) Foreign Application Priority Data

May 13, 2013  (KR) .......................... 10-2013-0053963

(51) Int. Cl.
*H04N 5/225* (2006.01)
*H04M 1/02* (2006.01)

(52) U.S. Cl.
CPC ............ *H04M 1/0264* (2013.01); *H04N 5/2254* (2013.01); *H04N 5/2257* (2013.01)

(58) Field of Classification Search
CPC .................................................... H04N 5/2257
USPC .................................................. 348/373–376
See application file for complete search history.

(56) References Cited

U.S. PATENT DOCUMENTS

2011/0006953 A1\* 1/2011 Chiang et al. ................ 343/702
2011/0255000 A1\* 10/2011 Weber et al. ................. 348/374
2013/0176484 A1\* 7/2013 Pilliod et al. ................ 348/373

FOREIGN PATENT DOCUMENTS

KR  10-2006-0028141  3/2006
        (A)
KR  10-2009-0008170  1/2009
        (A)
KR  10-2010-0090521  8/2010
        (A)

\* cited by examiner

*Primary Examiner* — Twyler Haskins
*Assistant Examiner* — Akshay Trehan
(74) *Attorney, Agent, or Firm* — Knobbe, Martens, Olson & Bear, LLP

(57) ABSTRACT

A display device is disclosed. In one aspect the display device includes a display panel having a display part and a camera, and a printed layer having a camera hole covering one surface of the display panel and exposing the camera. The display device also includes a light transmittance layer covering the printed layer, and a first surface of the light transmittance layer includes a display region corresponding to the display part and a peripheral region covering the camera hole. The peripheral region further includes a flat surface region which overlaps the camera hole.

14 Claims, 5 Drawing Sheets

DISPLAY DEVICE AND MOBILE TERMINAL HAVING THE SAME

CROSS-REFERENCE TO RELATED APPLICATIONS

This application claims priority under 35 USC §119 to Korean Patent Application No. 10-2013-0053963 filed on May 13, 2013 in the Korean Intellectual Property Office (KIPO), the entire disclosure of which is incorporated herein by reference.

BACKGROUND

1. Field

The described technology generally relates to a display device and a mobile terminal having the display device, particularly, to a display device having a light transmittance layer and a mobile terminal having the display device.

2. Description of the Related Technology

Typically, mobile terminals are portable devices which can perform various functions, such as voice and video calls, input and output of information, data storage and the like.

Generally, the surface of a light transmittance layer of a typical mobile terminal is curved. Additionally, the camera hole region of the light transmittance layer is also curved. Accordingly, when incident light travels through the curved region of the surface of the light transmittance layer, the light is refracted. Due to the refraction of incident light, light reaching the inside of the light transmittance layer may be altered by a fish-eye effect. Due to the fish-eye effect, the image produced by a photo may be distorted.

SUMMARY OF CERTAIN INVENTIVE ASPECTS

One inventive aspect is a display panel including a light transmittance layer having a planar structure in a camera hole region of the light transmittance layer.

However, embodiments of the described technology are not limited to the above, but may be variously modified without departing from the scope and spirit of present inventive concept.

Another inventive aspect is a display device which includes a display panel having a display part and a camera, and a printed layer which covers one surface of the display panel and includes a camera hole that exposes the camera. The display device also includes a light transmittance layer which covers the printed layer; a first surface of the light transmittance layer comprises a display region corresponding to the display part and a peripheral region covering the camera hole. The peripheral region further comprises a flat surface region which overlaps the camera hole.

In exemplary embodiments, a distance from an edge of a camera hole to an edge of the flat surface region may be more than about 0.1 mm.

In exemplary embodiments, the light transmittance layer may comprise glass or plastic.

In exemplary embodiments, the peripheral region may include a first curved surface region and an inclined surface formed between the flat surface region and the first curved surface region.

In exemplary embodiments, the flat surface region may be connected to the inclined surface and the first curved surface region, and an angle between the flat surface region and the inclined surface may be more than 1 degree and less than 180 degrees.

In exemplary embodiments, a second surface of the light transmittance layer opposite the first surface may face the printed layer and may include a second curved surface region.

In exemplary embodiments, the inclined surface may surround the flat surface region, and an angle between the flat surface region and the inclined surface may be more than about 1 degree and less than about 180 degrees.

In exemplary embodiments, a second surface of the light transmittance layer opposite the first surface may face the printed layer and may include a second curved surface region.

Another inventive aspect is a mobile terminal which includes a main body and a display device comprising a display panel including a display part and a camera, and a printed layer covering one surface of the display panel and having a camera hole that exposes the camera. The display device further comprises a light transmittance layer covering the printed layer; a first surface of the light transmittance layer comprises a display region corresponding to the display part and a peripheral region covering the camera hole. The peripheral region further comprises a flat surface region which overlaps the camera hole.

In exemplary embodiments, a distance from an edge of the camera hole to an edge of the flat surface region may be more than about 0.1 mm.

In exemplary embodiments, the light transmittance layer comprises glass or plastic.

In exemplary embodiments, the peripheral region may include a first curved surface region and an inclined surface formed between the flat surface region and the first curved surface region.

In exemplary embodiments, the flat surface region may be connected to the inclined surface and the first curved surface region, and an angle between the flat surface region and the inclined surface may be more than about 1 degree and less than 180 about degrees.

In exemplary embodiments, a second surface of the light transmittance layer opposite the first surface may face the printed layer and may include a second curved surface region.

In exemplary embodiments, the inclined surface may surround the flat surface region, and an angle between the flat surface region and the inclined surface may be more than about 1 degree and less than about 180 degrees.

In exemplary embodiments, the flat surface region may be connected to the inclined surface and the first curved surface region, and an angle between the flat surface region and the inclined surface may be more than about 1 degree and less than 180 about degrees.

In exemplary embodiments, a second surface of the light transmittance layer opposite the first surface may face the printed layer and may include a second curved surface region.

According to at least one of the exemplary embodiment, a camera hole region of a light transmittance layer may have a planar shape. Thus, distortion of light reaching the inside of the light transmittance layer may be prevented.

BRIEF DESCRIPTION OF THE DRAWINGS

Exemplary embodiments of the described technology will be more clearly understood in view of the following detailed description and the accompanying drawings.

FIGS. 1A to 5B illustrate non-limiting, exemplary embodiments as described herein.

FIG. 1A is an exploded perspective view illustrating a mobile terminal in accordance with embodiments of the described technology.

FIG. 5B is a cross-sectional view taken along line E-E' of FIG. 5A.

DETAILED DESCRIPTION OF CERTAIN INVENTIVE EMBODIMENTS

Figure 1A:
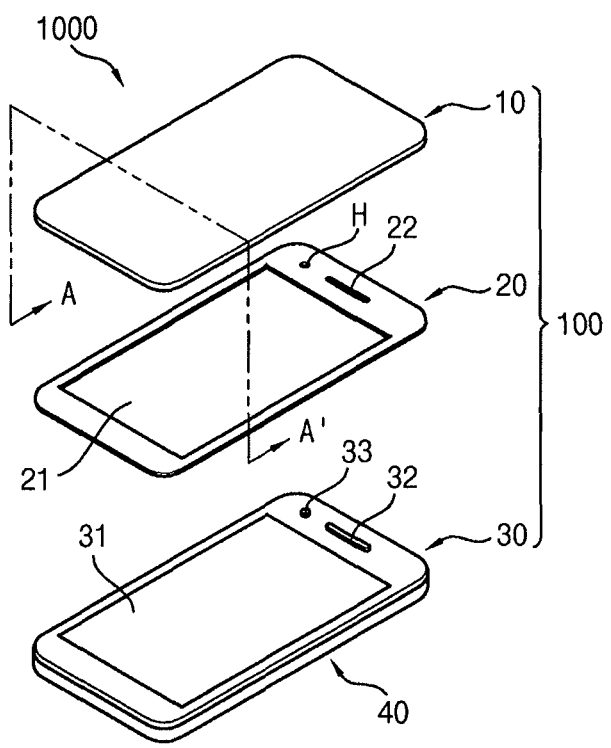

Various exemplary embodiments of the described technology will be described more fully hereinafter with reference to the accompanying drawings, in which exemplary embodiments are shown. The present inventive concept may, however, be embodied in many different forms and should not be construed as limited to the exemplary embodiments set forth herein. Rather, these exemplary embodiments are provided so that the disclosure will be thorough and complete, and will fully convey the scope of the present inventive concept to those skilled in the art. In the drawings, the sizes and relative sizes of layers and regions may be exaggerated for clarity. Like numerals refer to like elements throughout.

It will be understood that, although the terms first, second, third etc. may be used herein to describe various elements, these elements should not be limited by these terms. These terms are used to distinguish one element from another. Thus, a first element discussed below could be termed a second element without departing from the teachings of the present inventive concept. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is only intended to describe particular exemplary embodiments and is not intended to be limiting of the present inventive concept. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which the present inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1B:
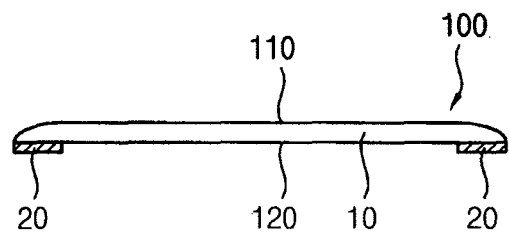
FIG. 1B is a cross-sectional view taken along line A-A' of FIG. 1A.

FIG. 1A is an exploded perspective view illustrating a mobile terminal in accordance with exemplary embodiments of the described technology. FIG. 1B is a cross-sectional view taken along line A-A' of FIG. 1A.

Referring to FIG. 1A, a mobile terminal 1000 includes a display device 100 and a main body 40.

The display device 100 includes a light transmittance layer 10, a printed layer 20 and a display panel 30.

The light transmittance layer 10 is disposed in the uppermost layer. In some embodiments, the light transmittance layer is larger than a panel that is disposed inside. The light transmittance layer 10 may be formed of tempered glass or a synthetic resin.

Referring to FIG. 1B, the light transmittance layer 10 includes a first surface 110 and a second surface 120 opposite the first surface 110. The first surface 110 forms a curved surface region, an inclined surface and a substantially flat surface region (hereinafter to be interchangeably used with "a flat surface region") in a region overlapping a camera hole H. The second surface 120 may be a substantially flat surface, however, the second surface 120 is not limited thereto.

The printed layer 20 is disposed under the light transmittance layer 10. The printed layer 20 includes a camera hole H, a speaker hole 22 and a display region 21. The printed layer 20 substantially blocks, completely blocks or substantially completely blocks (hereinafter to be referred to "substantially blocks") light from a backlight unit of the display panel 30. The printed layer 20 covers the inside of the mobile terminal. The printed layer 20 may be various colors.

The display panel 30 includes a display part 31, a speaker 32 and a camera 33.

The main body 40 has an inner receiving space covered by an external case. A plurality of electrical components may be mounted in the inner receiving space.

A key button part may be mounted at a side surface or one surface of the main body 40.

Hereinafter, the light transmittance layer 10 will be described in detail.

Figure 2A:
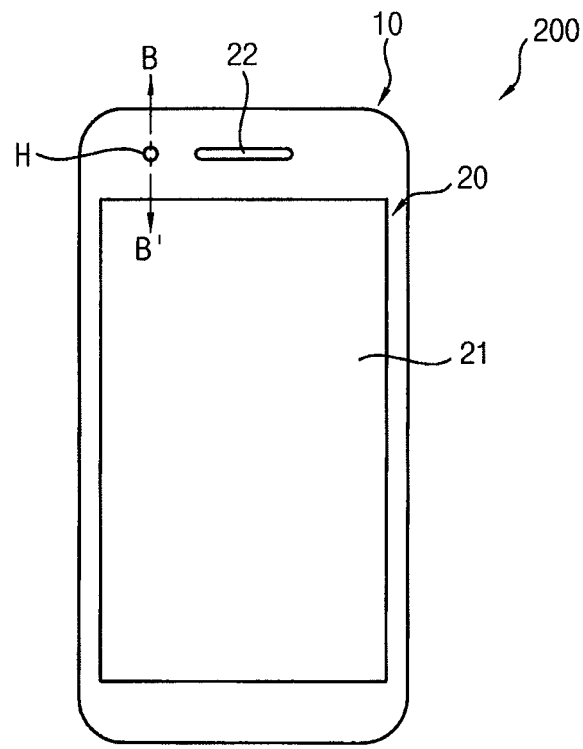
FIG. 2A is a plan view illustrating a display device in accordance with embodiments of the described technology.
Figure 2B:
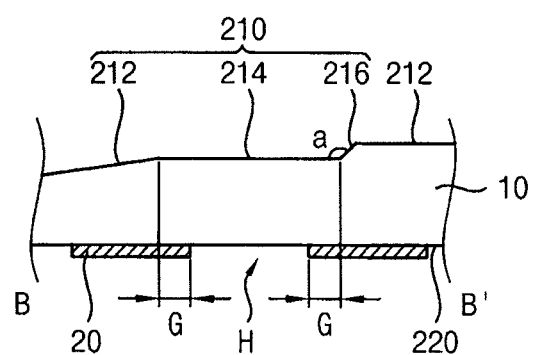
FIG. 2B is a cross-sectional view taken along line B-B' of FIG. 2A.

FIG. 2A is a plan view illustrating a display device in accordance with exemplary embodiments of the described technology. FIG. 2B is a cross-sectional view taken along line B-B' of FIG. 2A.

Referring to FIG. 2A, a display device 200 includes a display panel, a printed layer 20 covering the display panel and a light transmittance layer 10 covering the printed layer 20.

The display panel may include a display part and a camera.

The printed layer 20 is disposed under the light transmittance layer 10. The printed layer 20 includes a camera hole H, a speaker hole 22 and a display region 21. The printed layer 20 substantially blocks light from a backlight unit of the display panel 30. The printed layer 20 covers the inside of the mobile terminal. The printed layer 20 may be various colors.

The light transmittance layer 10 may be formed of tempered glass or a synthetic resin.

Referring to FIG. 2B, the light transmittance layer 10 includes a first surface 210 and a second surface 220. The first surface 210 includes a curved surface region 212, a flat surface region 214 connected to the curved surface region 212 and an inclined surface 216 disposed between the curved surface region 212 and the flat surface region 214. The first surface 210 may be a flat surface.

The flat surface region 214 may at least partially overlap the camera hole H of the printed layer 20. The flat surface region 214 is substantially parallel to the second surface 220. The flat surface region 214 may have a diameter or a width of more than about 0.2 mm. A distance from a boundary between the curved surface region 212 and the flat surface region 214 to the camera hole H may be more than about 0.1 mm. A distance from a boundary between the flat surface region 214 and the inclined surface 216 to the camera hole H may be more than about 0.1 mm. An angle a between the flat surface region 214 and the inclined surface 216 may be more than about 1 degree and less than about 180 degrees.

Figure 3A:
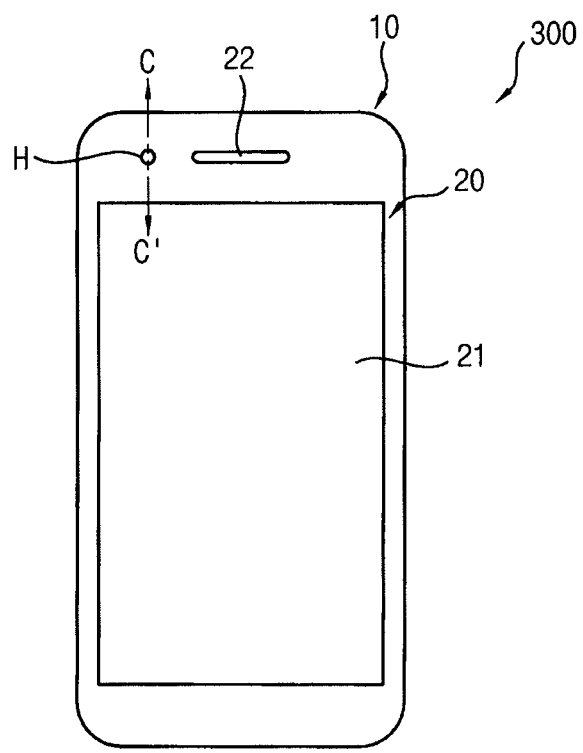
FIG. 3A is a plan view illustrating a display device in accordance with embodiments of the described technology.
Figure 3B:
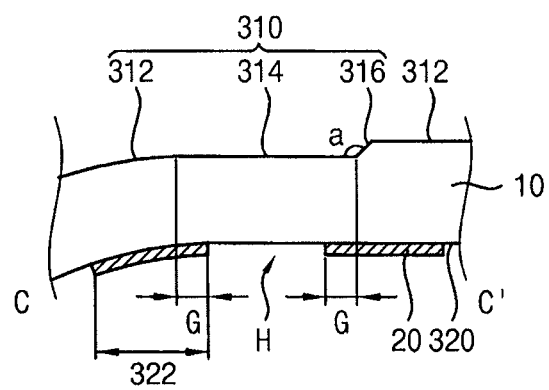
FIG. 3B is a cross-sectional view taken along line C-C' of FIG. 3A.

FIG. 3A is a plan view illustrating a display device in accordance with embodiments of the described technology. FIG. 3B is a cross-sectional view taken along line C-C' of FIG. 3A.

Referring to FIG. 3A, a display device 300 includes a display panel, a printed layer 20 covering the display panel and a light transmittance layer 10 covering the printed layer 20.

The display panel may include a display part and a camera.

The printed layer 20 is disposed under the light transmittance layer 10. The printed layer 20 includes a camera hole H, a speaker hole 22 and a display region 21. The printed layer 20 substantially blocks light from a backlight unit of the display panel 30. The printed layer 20 covers the inside of the mobile terminal. The printed layer 20 may be various colors.

The light transmittance layer 10 may be formed with tempered glass or a synthetic resin.

Referring to FIG. 3B, the light transmittance layer 10 includes a first surface 310 and a second surface 320. The first surface 310 includes a curved surface region 312, a flat surface region 314 connected to the curved surface region 312 and an inclined surface 316 disposed between the curved surface region 312 and the flat surface region 314. The second surface 320 includes a region overlapping the camera hole H. A curved surface region 322 of the second surface 320 may be a curved surface, however the curved surface region 322 of the second surface 320 is not limited thereto.

The flat surface region 314 overlaps the camera hole H of the printed layer 20. The flat surface region 314 is substantially parallel to the second surface 320. The flat surface region 314 may have a diameter or a width of more than about 0.2 mm. A distance from a boundary between the curved surface region 312 and the flat surface region 314 to the camera hole H may be more than about 0.1 mm. A distance from a boundary between the flat surface region 314 and the inclined surface 316 to the camera hole H may be more than about 0.1 mm. An angle a between the flat surface region 314 and the inclined surface 316 may be more than about 1 degree and less than about 180 degrees.

Figure 4A:
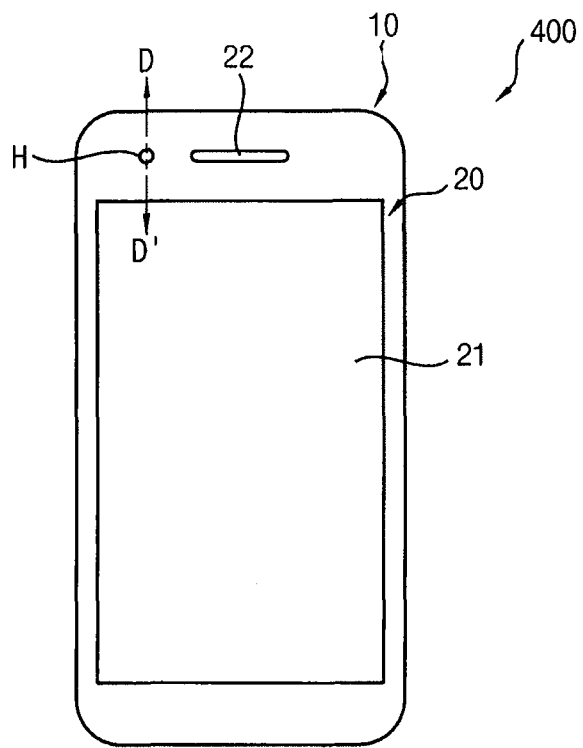
FIG. 4A is a plan view illustrating a display device in accordance with embodiments of the described technology.
Figure 4B:
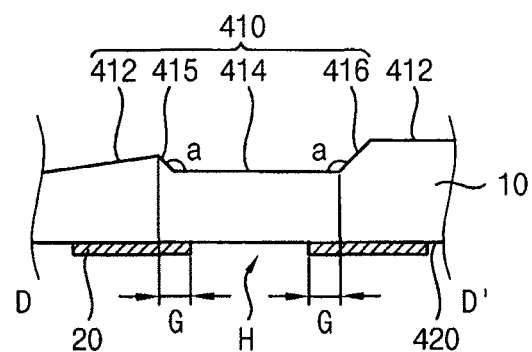
FIG. 4B is a cross-sectional view taken along line D-D' of FIG. 4A.

FIG. 4A is a plan view illustrating a display device in accordance with embodiments of the described technology. FIG. 4B is a cross-sectional view taken along line D-D' of FIG. 4A.

Referring to FIG. 4A, a display device 400 includes a display panel, a printed layer 20 covering the display panel and a light transmittance layer 10 covering the printed layer 20.

The display panel may include a display part and a camera.

The printed layer 20 is disposed under the light transmittance layer 10. The printed layer 20 includes a camera hole H, a speaker hole 22 and a display region 21. The printed layer 20 substantially blocks light from a backlight unit of the display panel 30. The printed layer 20 covers the inside of the mobile terminal. The printed layer 20 may be various colors.

The light transmittance layer 10 may be formed of tempered glass or a synthetic resin.

Referring to FIG. 4B, the light transmittance layer 10 includes a first surface 410 and a second surface 420. The first surface 410 includes a curved surface region 412 and first and second inclined surfaces 415 and 416 connected to the curved surface region 412. The first surface 510 also includes a flat surface region 414 between the first inclined surface 415 and the second inclined surface 416. The second surface 420 may be a substantially flat surface, however the shape of the second surface 420 is not limited thereto.

The flat surface region 414 may at least partially overlap the camera hole H of the printed layer 20. The flat surface region 414 is substantially parallel to the second surface 420. The flat surface region 414 may have a diameter or a width of more than about 0.2 mm. A distance from a boundary between the curved surface region 412 and the inclined first surface region 415 to the camera hole H may be more than about 0.1 mm. A distance from a boundary between the flat surface region 414 and the second inclined surface 416 to the camera hole H may be more than about 0.1 mm. An angle a between the flat surface region 414 and the first or second inclined surface 415 or 416 may be more than about 1 degree and less than about 180 degrees.

Figure 5A:
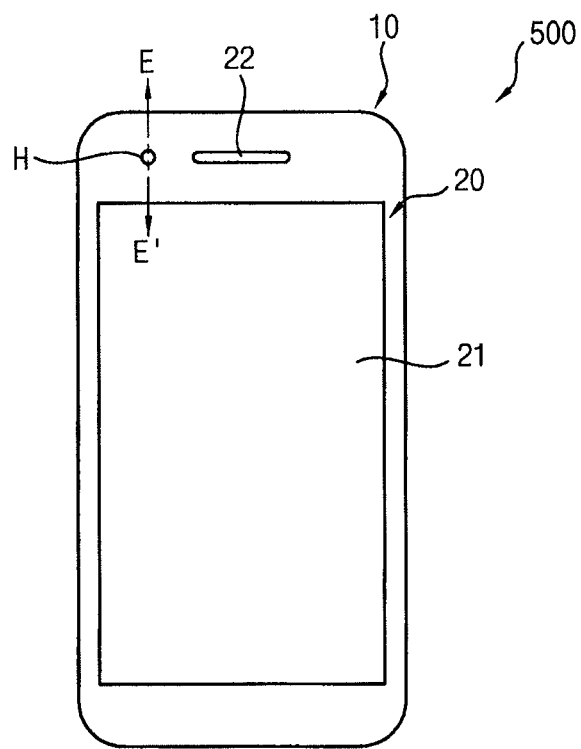
FIG. 5A is a plan view illustrating a display device in accordance with embodiments of the described technology.
Figure 5B:
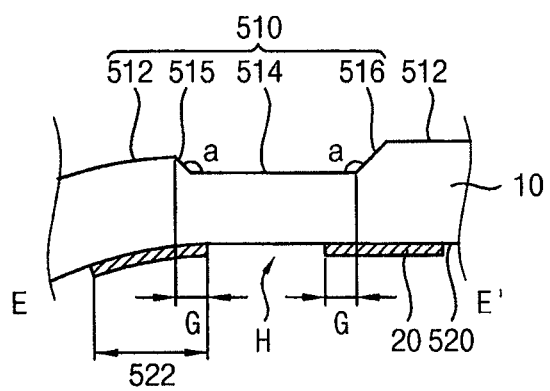

FIG. 5A is a plan view illustrating a display device in accordance with embodiments of the described technology. FIG. 5B is a cross-sectional view taken along line E-E' of FIG. 5A.

Referring to FIG: 5A, a display device 500 includes a display panel, a printed layer 20 covering the display panel and a light transmittance layer 10 covering the printed layer 20.

The display panel may include a display part and a camera.

The printed layer 20 is disposed under the light transmittance layer 10. The printed layer 20 includes a camera hole H, a speaker hole 22 and a display region 21. The printed layer 20 substantially blocks light from a backlight unit of the display panel 30. The printed layer 20 covers the inside of the mobile terminal. The printed layer 20 may be various colors.

The light transmittance layer 10 may be formed of tempered glass or a synthetic resin.

Referring to FIG. 5B, the light transmittance layer 10 includes a first surface 510 and a second surface 520. The first surface 510 includes a curved surface region 512 and first and second inclined surfaces 515 and 516 connected to the curved surface region 512. The first surface 510 also includes a flat surface region 514 between the first inclined surface 515 and the second inclined surface 516. The second surface 520 may be a curved surface, however the shape of the second surface 520 is not limited thereto.

The flat surface region 514 may at least partially overlap the camera hole H of the printed layer 20. The flat surface region 514 is substantially parallel to the second surface 520. The flat surface region 514 may have a diameter or a width of more than about 0.2 mm. A distance from a boundary between the curved surface region 512 and the first inclined surface region 515 to the camera hole H may be more than about 0.1 mm. A distance from a boundary between the flat surface region 514 and the second inclined surface 516 to the camera hole H may be more than about 0.1 mm. An angle a between the flat surface region 514 and the first or second inclined surface 515 or 516 may be more than about 1 degree and less than about 180 degrees.

According to at least one of the disclosed embodiments, a camera hole region of a light transmittance layer may have a planar shape. Thus, distortion of light reaching the inside of the light transmittance layer may be prevented.

The foregoing detailed description is illustrative of exemplary embodiments of the described technology and is not to be construed as limiting thereof. Although a number of exemplary embodiments have been described, those skilled in the art will readily appreciate that many modifications of the exemplary embodiments are possible without materially departing from the novel teachings and advantages of the present inventive concept. Accordingly, all such modifications are intended to be included within the scope of the present inventive concept as defined in the accompanying claims. Therefore, it is to be understood that the foregoing detailed description is illustrative of various exemplary embodiments and is not to be construed as limited to the specific exemplary embodiments disclosed, and that modifications to the disclosed exemplary embodiments, as well as other embodiments, are intended to be included within the scope of the accompanying claims.

What is claimed is:

1. A display device comprising:
   a display panel including a display part and a camera;
   a printed layer at least partially covering one surface of the display panel and including a camera hole that exposes the camera; and
   a light transmittance layer at least partially covering the printed layer;
   wherein a first surface of the light transmittance layer comprises a display region corresponding to the display part and a peripheral region at least partially covering the camera hole, and wherein the peripheral region comprises a substantially flat surface region at least partially overlapping the camera hole, a first curved surface region extending from the flat surface region and an inclined surface interconnecting the flat surface region and the first curved surface region, and wherein the angle formed between the flat surface region and the inclined surface is different from the angle formed between the first curved surface region and the flat surface region,
   wherein the angle between the flat surface region and the inclined surface is more than about 1 degree and less than about 180 degrees, and wherein a second surface of the light transmittance layer opposite the first surface faces at least a portion of the printed layer and comprises a second curved surface region.

2. The display device of claim 1, wherein the distance from an edge of the camera hole to an edge of the flat surface region is more than about 0.1 mm.

3. The display device of claim 1, wherein the light transmittance layer is formed at least partially of glass or plastic.

4. The display device of claim 1, wherein the inclined surface at least partially surrounds the flat surface region, and wherein the angle between the flat surface region and the inclined surface is more than about 1 degree and less than about 180 degrees.

5. The display device of claim 1, wherein the angle formed between the flat surface region and the inclined surface is greater than 90 degrees.

6. A display device comprising:
   a display panel including a display part and a camera;
   a printed layer at least partially covering one surface of the display panel and including a camera hole that exposes the camera; and
   a light transmittance layer at least partially covering the printed layer;
   wherein a first surface of the light transmittance layer comprises a display region corresponding to the display part and a peripheral region at least partially covering the camera hole, and wherein the peripheral region comprises a substantially flat surface region at least partially overlapping the camera hole, a first curved surface region extending from the flat surface region and an inclined surface interconnecting the flat surface region and the first curved surface region, and wherein the angle formed between the flat surface region and the inclined surface is different from the angle formed between the first curved surface region and the flat surface region, wherein the inclined surface at least partially surrounds the flat surface region,
   wherein the angle between the flat surface region and the inclined surface is more than about 1 degree and less than about 180 degrees, and wherein a second surface of the light transmittance layer opposite the first surface faces at least a portion of the printed layer and comprises a second curved surface region.

7. A mobile terminal comprising:
   a main body; and
   a display device housed in the main body, wherein the display device comprises:
   a display panel including a display part and a camera;
   a printed layer at least partially covering one surface of the display panel and including a camera hole that exposes the camera; and
   a light transmittance layer at least partially covering the printed layer;
   wherein a first surface of the light transmittance layer comprises a display region corresponding to the display part and a peripheral region at least partially covering the camera hole, and
   wherein the peripheral region comprises a substantially flat surface region at least partially overlapping the camera hole, a first curved surface region extending from the flat surface region and an inclined surface interconnecting the flat surface region and the first curved surface region, and wherein the angle formed between the flat surface region and the inclined surface is different from the angle formed between the first curved surface region and the flat surface region,
   wherein the angle between the flat surface region and the inclined surface is more than about 1 degree and less than about 180 degrees, and wherein a second surface of the light transmittance layer opposite the first surface faces at least a portion of the printed layer and comprises a second curved surface region.

8. The mobile terminal of claim 7, wherein the distance from an edge of the camera hole to an edge of the flat surface region is more than about 0.1 mm.

9. The mobile terminal of claim 8, wherein the light transmittance layer is formed at least partially of glass or plastic.

10. The mobile terminal of claim 7, wherein the inclined surface at least partially surrounds the flat surface region.

11. A mobile terminal comprising:
    a main body; and
    a display device housed in the main body, wherein the display device comprises:
    a display panel including a display part and a camera;
    a printed layer at least partially covering one surface of the display panel and including a camera hole that exposes the camera; and
    a light transmittance layer at least partially covering the printed layer;
    wherein a first surface of the light transmittance layer comprises a display region corresponding to the display part and a peripheral region at least partially covering the camera hole, and wherein the peripheral region comprises a substantially flat surface region at least partially overlapping the camera hole, a first curved surface region extending from the flat surface region and an inclined surface interconnecting the flat surface region and the first curved surface region, wherein the angle formed between the flat surface region and the inclined surface is different from the angle formed between the first curved surface region and the flat surface region, wherein the inclined surface at least partially surrounds the flat surface region, wherein the angle between the flat surface region and the inclined surface is more than about 1 degree and less than about 180 degrees, and wherein a second surface of the light transmittance layer opposite to the first surface faces at least a portion of the printed layer and comprises a second curved surface region.

12. A mobile terminal, comprising:
a display panel including a camera;
a printed layer at least partially covering one surface of the display panel and including a camera hole that exposes the camera; and
a light transmittance layer at least partially covering the printed layer;

wherein a first surface of the light transmittance layer comprises a flat surface region at least partially overlapping the camera hole, a first curved surface region extending from the flat surface region and an inclined surface interconnecting the flat surface region and the first curved surface region, and wherein the angle formed between the flat surface region and the inclined surface is different from the angle formed between the first curved surface region and the flat surface region, wherein the angle between the flat surface region and the inclined surface is more than about 1 degree and less than about 180 degrees, and wherein a second surface of the light transmittance layer opposite a first surface faces at least a portion of the printed layer and comprises a second curved surface region.

13. The mobile terminal of claim 12, wherein the inclined surface at least partially surrounds the flat surface region.

14. The mobile terminal of claim 12, wherein the display panel comprises backlight unit, and wherein the printed layer is configured to substantially block light from the backlight unit.

* * * * *